United States Patent [19]
Lorenz et al.

[11] Patent Number: 5,794,732
[45] Date of Patent: Aug. 18, 1998

[54] APPARATUS AND METHOD FOR STARTING A FUEL CELL VEHICLE

[75] Inventors: Helmut Lorenz, Unterensingen; Karl-Ernst Noreikat, Esslingen; Thomas Klaiber, Weinstadt; Wolfram Fleck, Erbach; Josef Sonntag, Illertissen; Gerald Hornburg, Elchingen; Andreas Gaulhofer, Salem, all of Germany

[73] Assignee: Daimler-Benz Aktiengesellschaft, Germany

[21] Appl. No.: 761,787

[22] Filed: Dec. 6, 1996

Related U.S. Application Data

[63] Continuation of Ser. No. 272,197, Jul. 8, 1994, abandoned.

[30] Foreign Application Priority Data

Jul. 8, 1993 [DE] Germany .................. 43 22 767.8

[51] Int. Cl.[6] ............................................. H01M 8/18
[52] U.S. Cl. .......................... 180/65.3; 429/13; 429/19
[58] Field of Search .......................... 180/65.1, 65.3; 429/9, 23, 38, 39, 12, 13, 19; 318/101, 102, 104, 112

[56] References Cited

U.S. PATENT DOCUMENTS

| | | | |
|---|---|---|---|
| 3,576,677 | 4/1971 | Keating et al. | 429/23 |
| 4,069,371 | 1/1978 | Zito | 429/38 |
| 4,081,693 | 3/1978 | Stone . | |
| 4,227,588 | 10/1980 | Biancardi | 180/167 |
| 4,741,978 | 5/1988 | Takabayashi | 429/23 |
| 4,923,768 | 5/1990 | Kaneko et al. . | |
| 5,228,529 | 7/1993 | Rosner | 180/65.3 |
| 5,248,566 | 9/1993 | Kumar et al. | 180/65.3 |
| 5,314,761 | 5/1994 | Pietrogrande et al. | 429/39 |
| 5,409,784 | 4/1995 | Bromberg et al. | 180/65.3 |
| 5,434,015 | 7/1995 | Yamada | 429/9 |
| 5,434,016 | 7/1995 | Benz et al. | 429/23 |

FOREIGN PATENT DOCUMENTS

| | | |
|---|---|---|
| 2846673 | 5/1979 | Germany . |
| 63-241876 | 3/1988 | Japan . |
| 2-168802 | 6/1990 | Japan . |
| 4-242075 | 8/1992 | Japan . |
| 4-342961 | 11/1992 | Japan . |
| wo 91/19328 | 12/1991 | WIPO . |

OTHER PUBLICATIONS

The GM High-Performance Induction Motor Drive System, Paul D. Agarwal IEEE Transactions on Power Apparatus and Systems, vol. PAS-88, No. 2, Feb. 1969, pp. 86-93.
Automobiltechnische Zeitschrift, Heinz G. Plust, ATZ, 69 Jahrgang, Nr. 6, Jun. 1967, pp. 175-183.

*Primary Examiner*—Anne Marie Boehler
*Attorney, Agent, or Firm*—Evenson, McKeown, Edwards & Lenahan, P.L.L.C.

[57] ABSTRACT

An apparatus and method for starting a vehicle which is driven by an electric drive unit supplied with electrical energy from a fuel cell. A compressor is arranged in the feed line of the fuel cell for the oxidant mass flow and is driven by an electric motor supplied with voltage from the fuel cell itself. For the purpose of starting the fuel cell, a starter motor is provided for driving the compressor which is fed from a 12 V starter battery. In addition, a safety interrogation is initiated before starting the vehicle. The fuel cell is not run up to a prescribed no-load power with the aid of the starter motor until successful termination of the safety interrogation. The drive unit is then released after this no-load power has been reached.

7 Claims, 3 Drawing Sheets

5,794,732

APPARATUS AND METHOD FOR STARTING A FUEL CELL VEHICLE

This is a continuation of application Ser. No. 08/272,197, filed Jul. 8, 1994, now abandoned.

CROSS-REFERENCE TO RELATED APPLICATION

This application is related to application Ser. No. 08/272,198 filed on Jul. 8, 1994 in the name of Helmut LORENZ, et al. for METHOD AND APPARATUS FOR VEHICLE FUEL CELL DYNAMIC POWER CONTROL.

BACKGROUND AND SUMMARY OF THE INVENTION

The present invention relates to an apparatus and a method for starting a vehicle having a drive fed by fuel cells, and, more particularly, to a vehicle comprising an electric drive unit, a fuel cell operatively connected with the drive unit and provided with a feed line in which a compressor is operatively arranged to be driven via an electric motor for compressing oxidant mass flow, the drive unit and the electric motor being operatively configured to be supplied with electrical energy from the fuel cell, a starter motor operatively connected to drive the compressor, and a starter battery configured to supply voltage to the starter motor.

An article by P. Agarwal in IEEE Transactions On Power Apparatus And Systems, 88 (1969) 2, pages 86–93 discusses a vehicle which is driven by an electric motor supplied with electrical energy with fuel cells.

An object of the present invention is to provide a device and a method for starting such a vehicle having fuel cells.

The foregoing object has been achieved in accordance with the present invention by providing a starter motor supplied with voltage from a starter battery to drive a compressor. The starter motor can be driven by a 12 V starter battery, making it possible to dispense with a relatively heavy and expensive back-up battery.

Special safety measures have to be taken in the case of vehicles in which fuel cells are used to generate electrical energy. In particular, in the case of fuel cells which are operated with hydrogen gas, the entire system must be checked before and during operation for uncontrolled escape of the working gas. Moreover, it must be assured for the purpose of preventing a fault in the fuel cell that the drive unit is not released until the minimum power of the fuel cell has been reached.

The method according to the present invention offers the advantage that the individual method steps are released only step by step. If a fault is detected during the safety interrogation, all further steps are stopped. If, by contrast, the safety interrogation procedure continues without a fault, the starting procedure is begun in the next step. Not until this step also terminates without disturbance, that is to say the minimum power of the fuel cell is reached, is the drive unit released. It is possible in this way to prevent both risk to the environment due to escaping hydrogen gas and damage to the fuel cells through overloading.

BRIEF DESCRIPTION OF THE DRAWINGS

These and other objects, features and advantages of the present invention will become more readily apparent from the following detailed description thereof when taken in conjunction with the accompanying drawings wherein.

DETAILED DESCRIPTION OF THE DRAWINGS

Figure 1:
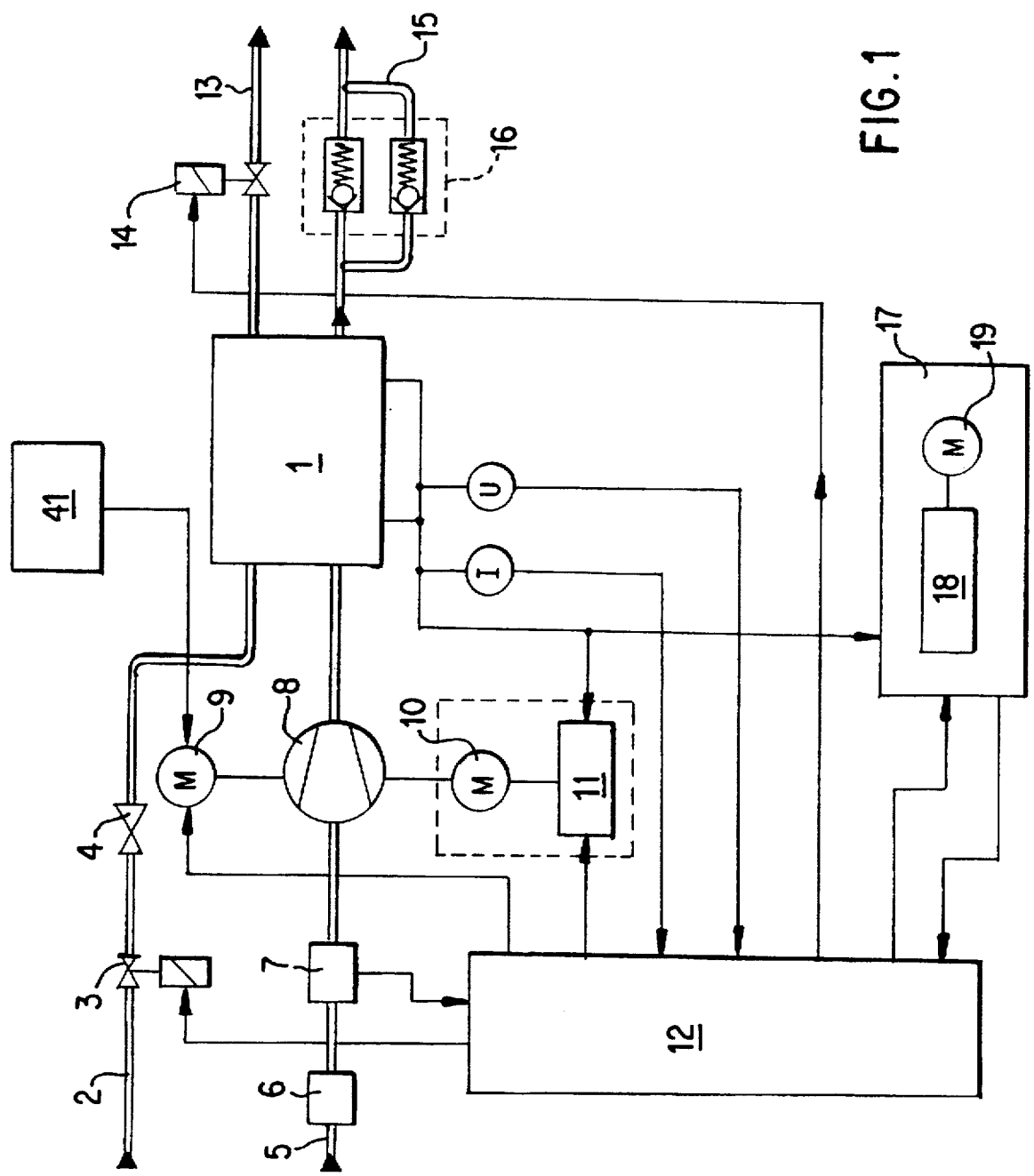
FIG. 1 is a schematic diagram of a fuel cell system arranged in a vehicle in accordance with the present invention.

The fuel cell designated generally by numeral 1 in FIG. 1 is fed a fuel such as, for example, hydrogen gas via a first supply lead 2 in which a valve 3 and a pressure regulator 4 are arranged. The fuel cell 1 is also fed an oxidant, preferably ambient air, via a second supply lead 5, in which an air filter 6, an air flow meter 7 and a compressor 8 are arranged. The fuel is oxidized on the anode in the fuel cell 1, and the oxidant is reduced on the cathode. In this electrochemical reaction, a voltage is produced between the two electrodes. It is possible to achieve voltages and current intensities which suffice for driving a vehicle, by connecting a plurality of such cells in parallel or in series to form a stack.

A starter motor 9 and an electric motor 10 drive the compressor 8. For starting purposes, the fuel cell 1 is fed via the compressor with sufficient air to generate a prescribed no-load power $p_{min}$. During this starting phase, the compressor 8 is driven via the starter motor 9 which is connected to a 12 V starter battery 41. It is thus possible to dispense with an otherwise customary back-up battery. As soon as the no-load power $p_{min}$ has been reached, the electric motor 10, which is supplied with voltage from the fuel cell 1, is engaged and the starter motor 9 is disconnected. The starting phase is terminated at this instant and the fuel cell now runs at no load.

In normal operation of the fuel cell 1, the speed n of the electric motor 10, and thus also of the compressor 8, can be regulated with a current controller 11 which is driven by a control unit 12. The oxidant mass flow $m_{acr}$ and thus the power $P_{FC}$ of the fuel cell 1 can be influenced via the speed n of the compressor 8.

The removal of the air from the fuel cell 1 is performed via a first exhaust line 15. A pressure regulating valve 16 is arranged in the first exhaust line 15 to maintain a constant operating pressure p in the fuel cell 1. In order to remove any deposits or pollutants of the hydrogen gas from the fuel cell 1, a second exhaust line 13 is provided, in which a so-called purge valve 14 is arranged. A drive unit 17 consisting of a second current controller 18 and an electric motor 19 is provided for the purpose of driving the vehicle.

Via conventional electric lines, the control unit 12 receives data on the instantaneous actual value $m_{acr}$ of the air mass flow, on the operating state of the drive unit 17 on the voltage U generated by the fuel cell 1, and on the corresponding current I. This data is processed in the control unit 12, and from this processed data control signals are generated for the current controllers 11 and 18, the valves 3 and 14 and the starter motor 9 which control signals are, in turn, transmitted to the individual components via corresponding lines.

Figure 2:
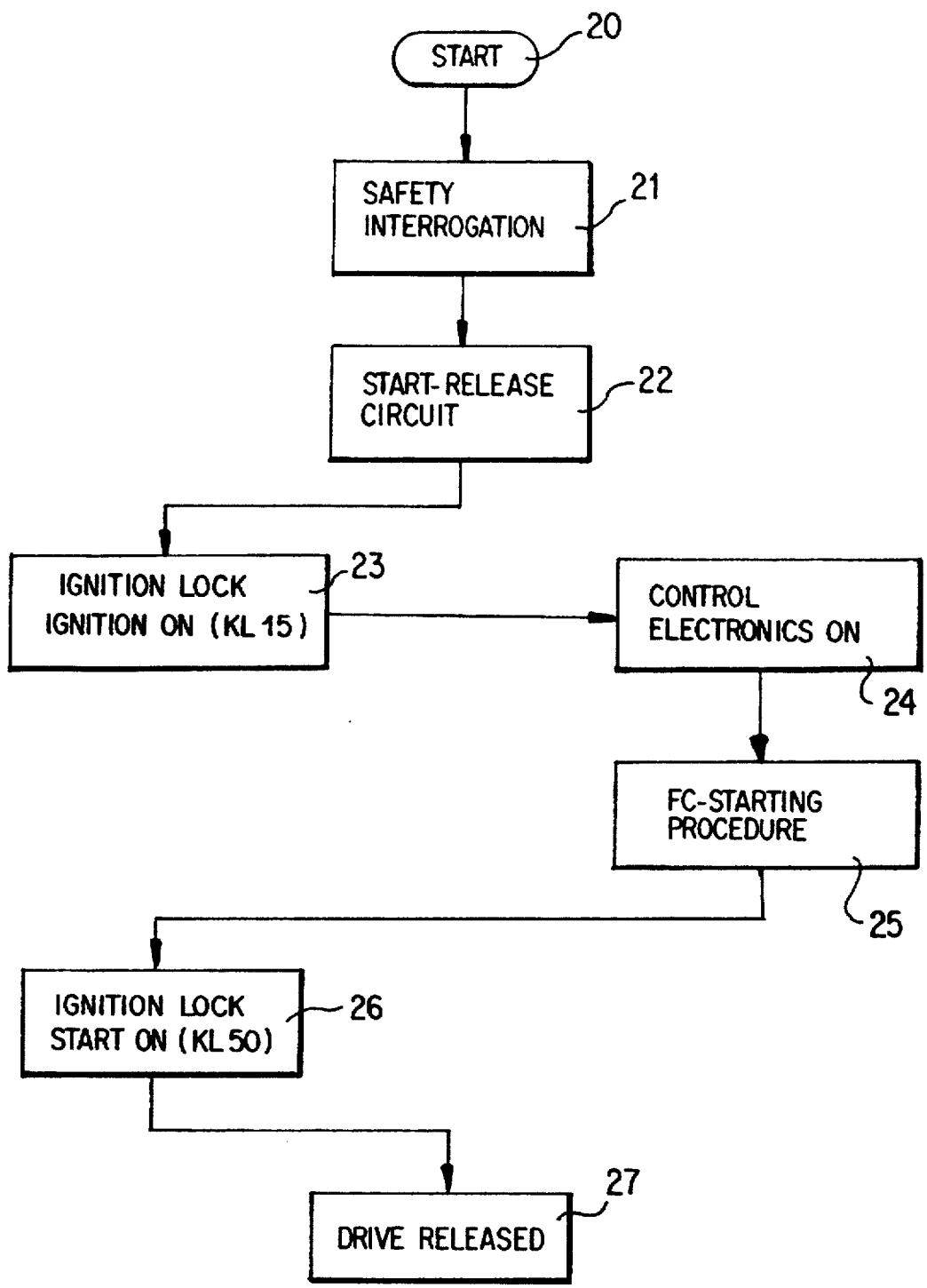
FIG. 2 is a flow diagram of a method according to the present invention for starting a vehicle which is driven by an electric drive unit supplied with electrical energy from a fuel cell.

The method described in FIG. 2 is started in block 20. This is performed by, for example, pressing a button, by the insertion of the ignition key or whenever a seat sensor detects that the driver's seat is occupied. However, the method is preferably started whenever it is detected in block 20 that a door on the vehicle, in particular the driver's door, is opened. The opening of the driver's door is the earliest possible instant at which an imminent start of the vehicle, and thus of the fuel cell 1, can be reasonably detected. A safety interrogation procedure is then activated or initiated in block 21. Both the main circuit and the 12V starting circuit are interrupted at this instant. The starting circuit is not released in block 22 until successful termination of the safety interrogation 21. By turning the ignition key to the ignition position KL 15 in block 23 in which the driver can then activate the control electronics in block 24 and subsequently initiate the fuel cell starting procedure 25. The fuel cell 1 runs with a prescribed no-load power $p_{min}$ after the end of the fuel cell starting procedure 25. At this instant, by turning the ignition key to the starting position, the driver can then release the main circuit and thus the vehicle drive. In order to prevent the vehicle drive from being released before the fuel cell starting procedure has been completed, either the ignition lock can be locked, with the result that the ignition key can be turned further only at prescribed instants, or although it is possible to turn the ignition key further at any time, the terminal 15 representing the position in block 23 when the ignition is switched on and the terminal 50 representing the position in block 26 at which the vehicle drive is released can be activated only at the prescribed instant.

Figure 3:
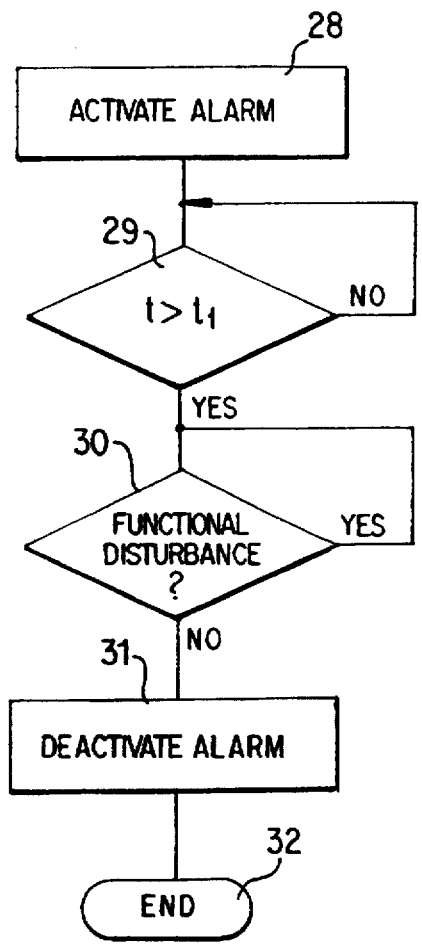
FIG. 3 is an embodiment of a safety interrogation procedure from FIG. 2.

FIG. 3 shows an embodiment of a safety interrogation procedure 21 in accordance with FIG. 2. The safety interrogation is to be used before starting the fuel cell 1 in order to determine whether the entire system is in a functional and safe operating state. For this purpose, it is checked, for example, whether, for example, hydrogen gas is escaping uncontrolled at any point in the system. If such a functional disturbance exists, the starting process of the fuel cell is stopped. An alarm signal is activated for this purpose at the start of the safety interrogation 21 in block 28. At the same time, a warning tone and/or a warning lamp are switched on, and the 12 V starting circuit is blocked. The gas sensors used to monitor the operating items such as hydrogen gas are, however, nevertheless supplied with voltage. The safety interrogation 21 is then interrupted in block 29 for a prescribed period t1 which is required to preheat the gas sensors. Subsequently, the signals of the gas sensors are evaluated and checked in block 30. If a functional disturbance is determined in this process, a return is made to the start of block 30 until the gas sensors signal a normal operating state. If, however, the gas sensors supply regular signals in block 30, the alarm signal is reset in block 31 and the safety interrogation is subsequently terminated regularly in block 32.

Figure 4:
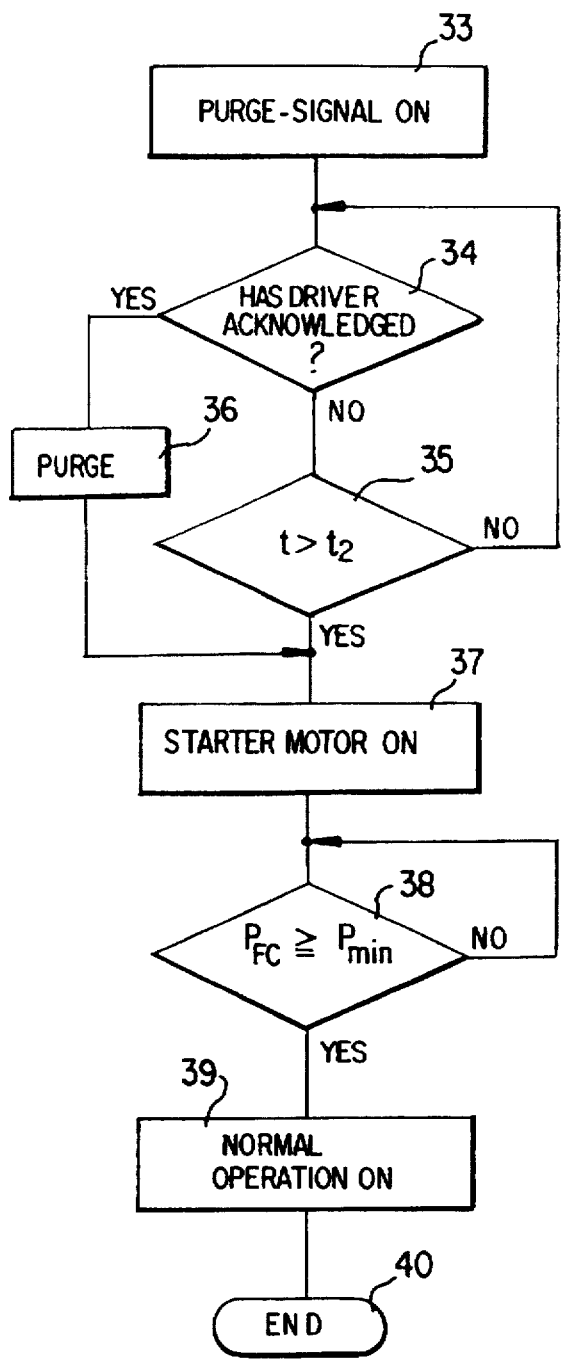
FIG. 4 is an embodiment of a fuel cell starting procedure in connection with the process of FIG. 2.

Finally, FIG. 4 shows an embodiment of a fuel cell starting procedure 25 in accordance with FIG. 2. After the control electronics have been switched on in block 24, the starting procedure 25 is initiated in block 33. A warning lamp which indicates a fuel cell disturbance is firstly activated. Moreover, the valve 3 is opened, and an indicator lamp which instructs the driver to purge is switched on. Purging is the controlled bleeding of fuel, for example, of hydrogen gas, into the ambient air. In systems in which the fuel is led in a closed circuit through the fuel cells, purging is required in order to remove pollutants at specific time intervals.

A check is made in block 34 as to whether the driver has acknowledged the instruction to purge from the tell-tale lamp. If this is not the case, a check is made in block 35 as to whether a prescribed period $t_2$ has elapsed since the activation of the tell-tale lamp. If this period $t_2$ has not yet expired, a return is made to the start of block 34 either until the driver triggers the purging operation in block 36 by acknowledgement, or the prescribed period $t_2$ has elapsed. Purging is not automatically started, since in the event of escape of hydrogen gas, dangerous situations could arise under specific conditions, for example if the vehicle is located in a closed space and thus adequate thinning of the escaping hydrogen is not ensured.

The starter motor 9, which is supplied with current from a 12 V starter battery 41, is then started in block 37. The starter motor 9 drives the compressor 8, with the aid of which ambient air is delivered into the fuel cell 1. Since hydrogen gas is continuously available at the anode of the fuel cell 1, feeding oxygen-containing ambient air to the cathode of the fuel cell 1 leads to the start of an electrochemical reaction. The heat produced during this reaction then leads to heating of the fuel cell 1. This heating is certainly desired during starting, since the power $p_{FC}$ of the fuel cell 1 is temperature dependent. It is not necessary to cool the fuel cell 1 until high load operations.

The power $p_{FC}$ of the fuel cell 1 is subsequently compared in block 38 to a prescribed no-load power $p_{min}$. If it is detected in this process that the no-load power $p_{min}$ has already been reached, a switch-over to normal operation is made in block 39, and the starting procedure is subsequently terminated in block 40. Otherwise, a return is made to the start of block 38 until the no-load power $p_{min}$ has been reached. In the case of switch-over to normal operation, the electric motor 10, whose speed n is adjusted by the control unit 12 with the aid of the current controller 11 is activated. The starter motor 9 is subsequently switched off. In addition, the warning lamp is switched off and the cooling circuit for the fuel cell 1 is set operating.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. A vehicle comprising an electric drive unit, a fuel cell operatively connected with the drive unit and provided with a feed line in which a compressor is operatively arranged to be driven via an electric motor for compressing oxidant mass flow, the drive unit and the electric motor being operatively configured to be supplied with electrical energy from the fuel cell, a starter motor operatively connected to drive the compressor, and a starter battery configured to supply voltage to the starter motor.

2. A method for starting a vehicle comprising an electric drive unit, a fuel cell operatively connected with the drive unit and provided with a feed line in which a compressor is operatively arranged to be driven via an electric motor for compressing oxidant mass flow, the drive unit and the electric motor being operatively configured to be supplied with electrical energy from the fuel cell, a starter motor operatively connected to drive the compressor, and a starter battery configured to supply voltage to the starter motor comprising the steps of (a) initiating a safety interrogation is started after the start of the method, (b) after successful termination of the safety interrogation, starting the fuel cell with the starter 15 motor; and (c) only after the fuel cell has reached a predetermined no-load power activating the electric motor, deactivating the starter motor and releasing the drive unit.

3. The method according to claim 2, wherein the safety interrogation step is initiated by opening a vehicle door.

4. The method according to claim 2, wherein the safety interrogation step is interrupted until gas sensors arranged in the vehicle have reached a predetermined operating temperature, and the safety interrogation step is terminated as soon as the gas sensors deliver regular signals.

5. The method according to claim 2, wherein step (c) further includes switching on a cooling water pump of the fuel cell.

6. The method according to claim 2, wherein, at the beginning of the start of the method, a valve in a fuel supply line to the fuel cell is opened, and a vehicle driver is subsequently instructed by activation of a warning lamp to-purge an exhaust line of the fuel cell.

7. The method according to claim 2, wherein after acknowledgement of a warnings signal by a vehicle driver, a purge valve operatively associated with an exhaust line of the fuel cell is opened for a prescribed time period.

* * * * *